(12) United States Patent
Kim et al.

(10) Patent No.: US 11,170,448 B2
(45) Date of Patent: Nov. 9, 2021

(54) CLAIM ANALYSIS WITH DEEP LEARNING

(71) Applicant: AKASA, Inc., South San Francisco, CA (US)

(72) Inventors: Byung-Hak Kim, San Jose, CA (US); Hariraam Varun Ganapathi, San Francisco, CA (US); Andrew Atwal, Foster City, CA (US)

(73) Assignee: AKASA, Inc., South San Francisco, CA (US)

( * ) Notice: Subject to any disclaimer, the term of this patent is extended or adjusted under 35 U.S.C. 154(b) by 0 days.

(21) Appl. No.: 16/818,899

(22) Filed: Mar. 13, 2020

(65) Prior Publication Data

US 2021/0192635 A1 Jun. 24, 2021

Related U.S. Application Data

(60) Provisional application No. 62/951,934, filed on Dec. 20, 2019.

(51) Int. Cl.
*G06Q 40/08* (2012.01)
*G06K 9/62* (2006.01)
*G06F 17/18* (2006.01)
*G06N 3/08* (2006.01)

(52) U.S. Cl.
CPC ............ *G06Q 40/08* (2013.01); *G06F 17/18* (2013.01); *G06K 9/6267* (2013.01); *G06N 3/08* (2013.01)

(58) Field of Classification Search
CPC ...... G06Q 40/08; G06F 17/18; G06K 9/6267; G06N 3/08
See application file for complete search history.

(56) References Cited

U.S. PATENT DOCUMENTS

| | | | |
|---|---|---|---|
| 2010/0094664 A1* | 4/2010 | Bush | G06Q 40/08 705/4 |
| 2017/0169331 A1* | 6/2017 | Garner | G05B 13/00 |
| 2018/0293242 A1* | 10/2018 | Shishkin | G06F 16/3347 |

OTHER PUBLICATIONS

Abdullah, U. et al., "Comparative Study of Medical Claim Scrubber and a Rule Based System," IEEE, In Proceedings of the 2009 International Conference on Information Engineering and Computer Science, Dec. 19-20, 2009, pp. 161-164, Wuhan, China.

(Continued)

*Primary Examiner* — Scott C Anderson
(74) *Attorney, Agent, or Firm* — Berkeley Law & Technology Group, LLP

(57) ABSTRACT

Embodiments relate to system for automatically predicting payer response to claims. In an embodiment, the system receives claim data associated with a claim. The system identifies a set of claim features of the claim data, and generates an input vector with at least a portion of the set of claim features. The system applies the input vector to a trained model. A first portion of the neural network is configured to generate an embedding representing the input vector with a lower dimensionality than the input vector. A second portion of the neural network is configured to generate a prediction of whether the claim will be denied based on the embedding. The system provides the prediction for display on a user interface of a user device. The prediction may further include denial reason codes and a response date estimation to indicate if, when, and why a claim will be denied.

14 Claims, 7 Drawing Sheets

(56) References Cited

OTHER PUBLICATIONS

Bai, T. et al., "Medical Concept Representation Learning from Multi-source Data," Proceedings of the Twenty-Eighth International Conference on Artificial Intelligence (IIJCAI-19), Jul. 2019, pp. 4897-4903, Macao, China.

Barkholz, D. "Insurance claim denials cost hospitals $262 billion annually," Modern Healthcare, Jun. 27, 2017, two pages, [Online] [Retrieved on Jun. 26, 2020], Retrieved from the Internet<URL: https://www.modernhealthcare.com/article/20170627/NEWS/170629905/insurance-claim-denials-cost-hospitals-262-billion-annually>.

Bradley, P. et al., "turning hospital data into dollars: Healthcare financial executives can use predictive analytics to enhance their ability to capture charges and identify underpayments," Healthcare Financial Management, Feb. 2010, pp. 64-68, vol. 64, No. 2.

Carroll, L. "More than a third of U.S. healthcare costs go to bureaucracy," Reuters, Jan. 6, 2020, four pages, [Online] [Retrieved on Jun. 26, 2020], Retrieved from the Internet<URL: https://www.reuters.com/article/us-health-costs-administration/more-than-a-third-of-u-s-healthcare-costs-go-to-bureaucracy-idUSKBN1Z5261>.

Cho, K. et al., "Learning Phrase Representations using RNN Encoder-Decoder for Statistical Machine Translation," Proceedings of the 2014 Conference on Empirical Methods in Natural Language Processing (EMNLP), Oct. 25-29, 2014, pp. 1724-1734, Doha, Qatar.

Choi, E. et al., "MiME: Multilevel Medical Embedding of Electronic Health Records for Predictive Healthcare," $32^{nd}$ Conference on Neural Information Processing Systems (NIPS 2018), Dec. 2018, pp. 4547-4557, Montreal, Canada.

Department of Health & Human Services—USA, Centers for Medicare & Medicaid Services, "Understanding the Remittance Advice: A Guide for Medicare Providers, Physicians, Suppliers, and Billers," Mar. 2006, 179 pages, [Online] [Retrieved on Jul. 22, 2020], Retrieved from the Internet<URL: https://www.adldata.org/wp-content/uploads/2015/06/RA_Guide_Full_03-22-06.pdf>.

Ghani, R. et al., "Interactive Learning for Efficiently Detecting Errors in Insurance Claims," Proceedings of the $17^{th}$ ACM SIGKDD International Conference on Knowledge Discovery and Data Mining, Aug. 2011, pp. 325-333, San Diego, California, United States.

Hochreiter, S. et al., "Long Short-Term Memory," Neural Computation, Nov. 15, 1997, 49 pages, vol. 9, No. 8.

Medicare Web, "Front-end revenue cycle processes leading cause of denials," Revenue Cycle Advisor, Oct. 25, 2017, one page, [Online] [Retrieved on Jul. 10, 2020], Retrieved from the Internet<URL: https://revenuecycleadvisor.com/news-analysis/report-front-end-revenue-cycle-processes-leading-cause-denials>.

Pecci, A. W., "A nuts-and-bolts guide to AI" HealthLeaders, Jan. 8, 2020, five pages, [Online] [Retrieved on Jul. 8, 2020], Retrieved from the Internet<URL: https://www.healthleadersmedia.com/finance/nuts-and-bolts-guide-ai>.

Pecci, A. W., "Not Up on Robotic Process Automation for the Rev Cycle? Time to Pay Attention" HealthLeaders, Sep. 25, 2019, three pages, [Online] [Retrieved on Jul. 8, 2020], Retrieved from the Internet<URL: https://www.healthleadersmedia.com/finance/not-robotic-process-automation-rev-cycle-time-pay-attention>.

Simonyan, K. et al., "Deep Inside Convolutional Networks: Visualising Image Classification Models and Saliency Maps," arXiv preprint arXiv: 1312.6034, Dec. 2018, eight pages.

Zhong, Q.-Y. et al., "Medical Concept Representation Learning from Claims Data and Application to Health Plan Payment Risk Adjustment," arXiv preprint arXiv: 1907.06600, Jul. 2019, four pages.

Anand, et al, "A Data Mining Framework for Identifying Claim Overpayments for the Health Insurance Industry," Proceedings of the 3rd INFORMS Workshop on Data Mining and Health Informatics (DMHI 2008), Oct. 2008, 7 Pages.

Choi, et al, "Learning Low-Dimensional Representations of Medical Concepts," 2016 AMIA Joint Summits on Translation Science, Jul. 2016, San Francisco, CA, 10 Pages.

Ioffe, et al, "Batch Normalization: Accelerating Deep Network Training by Reducing Internal Covariate Shift," In 32nd International Conference on Machine Learning (ICML '15), Jul. 2015, Lille, France, 9 Pages.

Kim, et al, "Handmard Product for Low-Rank Bilinear Pooling," In 5th International Conference on Learning Representations (ICLR 2017), Apr. 2017, Toulon, France, 14 Pages.

Kumar, et al, "Data Mining to Predict and Prevent Errors in Health Insurance Claims Processing," In 16th ACM SIGKDD International Conference on Knowledge Discovery and Data Mining (KDD 2010), Jul. 2010, Washington DC, US, 9 Pages.

Miotto, et al, "Deep Patient: An Unsupervised Representation to Predict the Future of Patients from the Electronic Health Records," Scientific Reports, May 2016, 10 Pages.

Nair, et al, "Rectified Linear Units Improve Restricted Boltzmann Machines," In 27th International Conference on Machine Learning (ICML '10), Jun. 2010, Haifa, Israel, 8 Pages.

Rajkomar, et al, "Scalable and accurate deep learning with electronic health records,"Digital Medicine, vol. 1 No. 18, May 2018, 10 Pages.

Chimmad, et al, "Assessment of Healthcare Claims Rejection Risk Using Machine Learning," IEEE 19th International Conference on e-Health Networking Applications and Services (Healthcom), Oct. 2017, 6 Pages.

Shrank, et al, "Waste in the US Health Care System Estimated Costs and Potential for Savings," JAMA, Oct. 2019, vol. 322, No. 15, 9 Pages.

Tenenbaum, et al, "Separating Style and Content with Bilinear Models,"Neural Computation, Jun. 2000, vol. 12, 37 Pages.

Wojtusiak, et al, "Rule-based Prediction of Medical Claims' Payments," IEEE 10th International Conference on Machine Learning and Applications, Dec. 2011, 6 Pages.

Saito, et al, "The Precision-Recall Plot is More Informative than the ROC Plot When Evaluating Binary Classifiers on Imbalanced Datasets," PLOSE ONE, DOI:10.1371, journal.pone, 0118432, Mar. 4, 2015, 21 Pages.

HCPRO, "Report: Front-end revenue cycle processes leading cause of denials," Medicare Web, https://revenuecycleadvisor.com/news-analysis/report-front-end-revenue-cycle-processes-leading-cause-denials, Oct. 25, 2017, 2 Pages.

Kingma, et al, "Adam: A Method for Stochastic Optimization," https://www.semanticscholar.org/paper/Adam%3A-A-Method-for-Stochastic-Optimization-Kingma-Ba/a6cb366736791bcccc5c8639de5a8f9636bf87e8, Published as a conference paper at ICLR 2015, Jan. 30, 2017, 15 Pages.

X12, https://x12.org/codes/claim-adjustment-reason-codes, May 2019, 1 Page.

Abdullah, et al, "Comparative Study of Medical Claim Scrubber and a Rule Based System," https://www.academia.edu/7557098/Comparative_Study_of_Medical_Claim_Scrubber_And_A_Rule_Based_System, Dec. 2009, 5 Pages.

\* cited by examiner

US 11,170,448 B2

CLAIM ANALYSIS WITH DEEP LEARNING

CROSS-REFERENCE TO RELATED APPLICATION

This application claims benefit of U.S. Provisional Patent Application Ser. No. 62/951,934 filed Dec. 20, 2019, which is incorporated by reference.

TECHNICAL FIELD

The subject matter described generally relates to deep learning and, in particular, to a trained model that predicts payer responses to medical insurance claims.

BACKGROUND

Thousands of medical insurance claims are submitted a day. A significant proportion of those are either denied outright or paid only in part. Payment of claims may also be delayed while the insurer investigates aspects of the claims they deem suspect or suspicious. Currently, claims are reviewed and submitted by humans. As such, the reviews are subjective and prone to human error. Furthermore, any given person may not review a sufficient volume of claims to identify patterns.

SUMMARY

Embodiments relate to a claim analysis system for automatically predicting payer response to claims. The claim analysis system includes a model that is configured to predict multiple responses from multiple claims. The model includes task-specific layers to predict if and when a claim will be denied. The model may also identify which features of the claim contribute most to the denial probability of the claim. This allows users to identify and modify data-entry errors. By automatically analyzing claim data, the claim analysis system may eliminate biases associated with human analysis, increase efficiency, and accurately identify patterns in claims.

In one embodiment, a claim analysis system receives claim data associated with a claim. The claim analysis system identifies a set of claim features of the claim data, and generates an input vector with at least a portion of the set of claim features. The claim analysis system applies the input vector to a trained model (e.g., a neural network). A first portion of the neural network is configured to generate an embedding representing the input vector with a lower dimensionality than the input vector. A second portion of the neural network is configured to generate a prediction of whether the claim will be denied based on the embedding. The claim analysis system provides the prediction for display on a user interface of a user device. In some embodiments, the prediction includes a probability the claim will be denied, a first reason code sequence including likelihood scores for claim-level reason codes, a second reason code sequence including likelihood scores for service-level reason codes, and/or a response date estimation. The response date estimation may be a day interval between a remittance date and the corresponding claim submission date. In these embodiments, the neural network includes task specific layers configured to generate the probability the claim will be denied, the first reason code sequence, the second reason code sequence, and/or the response date estimation.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

DETAILED DESCRIPTION

The figures and the following description describe certain embodiments by way of illustration only. Wherever practicable, similar or like reference numbers are used in the figures to indicate similar or like functionality. One skilled in the art will readily recognize that alternative embodiments of the structures and methods may be employed without departing from the principles described.

Figure 1:
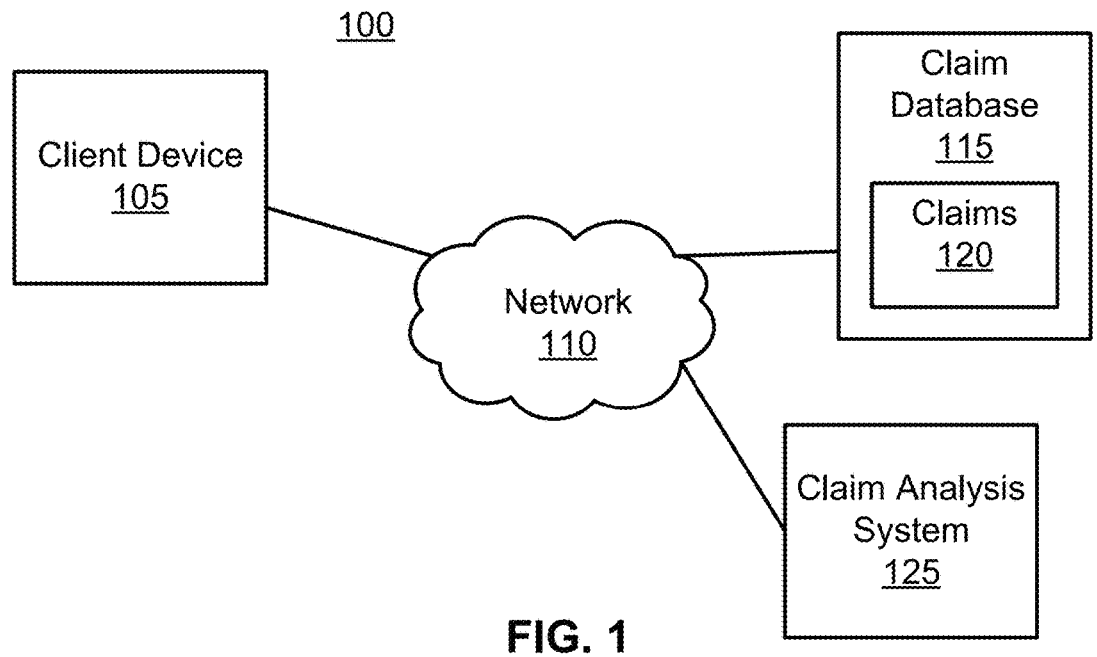
FIG. 1 is a block diagram illustrating a system environment suitable for providing automated claim analysis, according to one embodiment.

FIG. 1 illustrates one embodiment of a system environment 100 suitable for analyzing claims. In the embodiment shown, the system environment 100 includes a client device 105, a network 110, a claim database 115, and a claim analysis system 125. In other embodiments, the system environment 100 includes different and/or additional elements. In addition, the functions may be distributed among the elements in a different manner than described.

The client device 105 is one or more computing devices capable of receiving user input as well as transmitting and/or receiving data via a network 110. In one embodiment, a client device 105 is a computer system, such as a desktop or a laptop computer. Alternatively, a client device 105 may be a device having computer functionality, such as a personal digital assistant (PDA), a mobile telephone, a smartphone, or another suitable device. A client device 105 is configured to communicate via the network 110. The client device 105 may execute an application allowing a user of the client device 105 to interact with the claim analysis system 125 via a user interface. For example, a web browser application may enable interaction between the client device 105 and the claim analysis system 125 via the network 110 or a graphical user interface may be provided as part of a software application published by the claim analysis system 125 and installed on the user device 105. Alternatively, a client device 105 interacts with the claim analysis system 125 through an application programming interface (API) running on a native operating system of the client device 105, such as IOS® or ANDROID™.

The claim database 115 is one or more machine-readable media that stores claims 125. Claims 120 may be based on standard forms for outpatient and provider services and billing forms for inpatient services. For example, claims may be based on the Center for Medicare and Medicaid Services (CMS) 1500 form. Claims include patient information such as patient demographics (e.g., name, address, birth date, gender, and marital status), employment and insurance status, occupational limitations, dates of service, diagnoses and procedures, service provider information, and charges for services. In some embodiments, claim data is temporally bound such that the claim primarily reflects the diagnoses and services that occurred on the date when the claim was submitted. As such, claim data may be configured to not convey information that occurred during previous appointments. The claim database 115 may store the claims as raw claim data and/or as claim sequences generated by the claim analysis system 125 that include multiple elements ("features") representing the claim.

The claims database 115 may also include training data used to train one or more models of the claim analysis system 125. Training data may include claim response information, such as whether the claim was denied, a response date for the claim, and reasons for claim denial. In one embodiment, a module with similar or identical functionality to the claim database 115 is integrated into the claim analysis system 125.

The claim analysis system 125 analyzes claims to predict a payer response. The claim analysis system 125 predicts the likelihood the claim will be denied, a response date for the claim, and/or reasons for claim denial using a claim sequence of features representing the claim. The claim analysis system 125 provides the prediction for display (e.g., on a user interface on a client device 105 or a display of the claim analysis system). The claim analysis system 125 may also determine which aspects of the claim contributed most significantly to a claim's denial prediction. In one embodiment, the claim analysis system 125 does this by predicting a suspiciousness score for a portion of the claim features in a corresponding claim sequence. Further, the claim analysis system 125 provides users with a user interface to view suspiciousness scores and modify claim data accordingly. In this way, the claim analysis system 125 allows users to identify and rectify data that may have been entered incorrectly (e.g., due to human error). The claim analysis system 125 may also compare multiple claims across one or more health systems to identify patterns in claim data. The claim analysis system 125 may then determine correlations between claim data and denial probabilities, claim data and claim denial reason codes, patterns in response dates, and the like.

The user device 105, claim database 115, and claim analysis system 125 are configured to communicate via a network 110, which may include any combination of local area and/or wide area networks, using both wired and/or wireless communication systems. In one embodiment, a network 110 uses standard communications technologies and/or protocols. For example, a network 110 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 110 may be represented using any suitable format, such as hypertext markup language (HTML) or extensible markup language (XML). In some embodiments, all or some of the communication links of a network 110 may be encrypted using any suitable technique or techniques.

Figure 2:
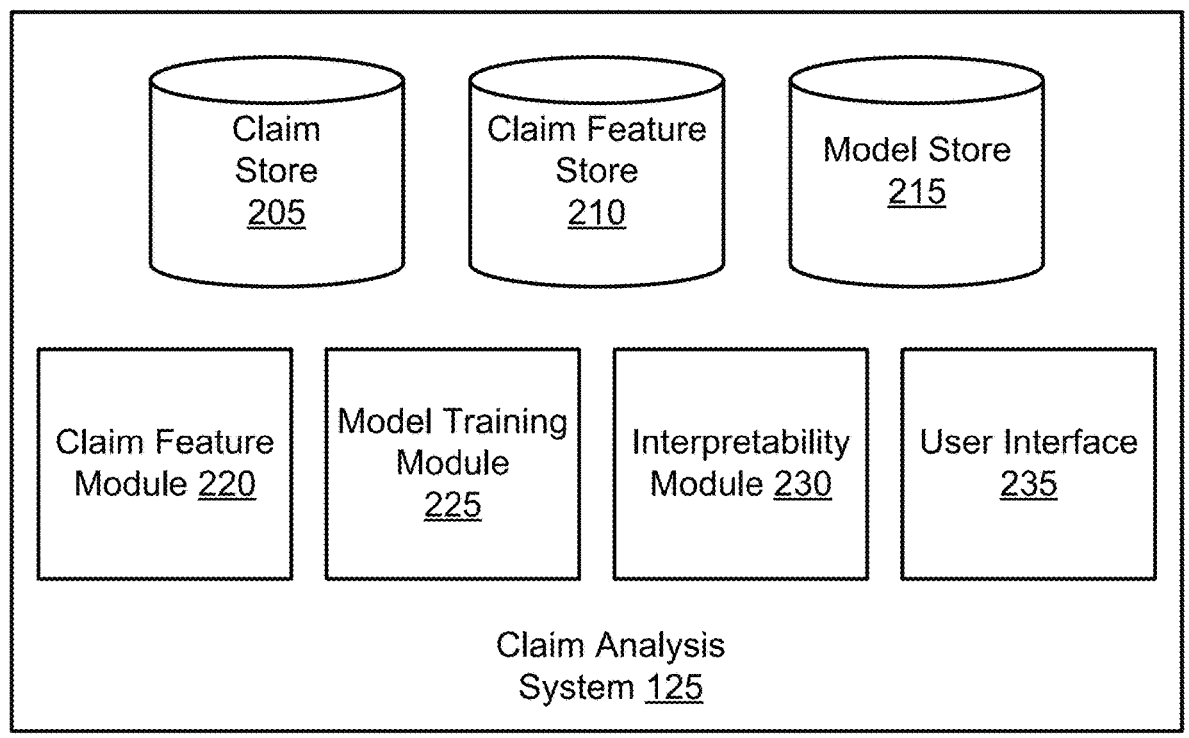
FIG. 2 is a block diagram illustrating a detailed view of modules within the claim analysis system of FIG. 1, according to one embodiment.

FIG. 2 shows one embodiment of the claim analysis system 125 of FIG. 1. In the embodiment shown, the claim analysis system 125 includes a claim store 205, a claim feature store 210, a model store 215, a claim feature module 220, a model training module 225, an interpretability module 230, and a user interface 235. In other embodiments, the claim analysis system 125 includes different and/or additional elements. In addition, the functions may be distributed among the elements in a different manner than described.

The claim analysis system 125 maintains claims in the claim store 205. The claim store may include local copies of some or all of the claims 120 stored in the claim database 115. Claims 120 may be based on standard forms for outpatient and provider services and billing forms for inpatient services. As previously discussed, claim data includes, but is not limited to, a combination of patient information such as patient demographics (e.g., name, address, birth date, gender, and marital status), employment and insurance status, occupational limitations, dates of service, diagnoses and procedures, service provider information, and charges for services. The claim store 205 may also include the duration of the corresponding service, total charges, time between the services and claim submission date, and the like. Claim data may also include metadata, such as claim creation date, edit date, and claim author. Further, the claim store 205 may store a log of changes made to claims for auditing and troubleshooting purposes. The claim data store 205 may be encrypted to protect the privacy of patients and subscribers corresponding to the claims.

The claim store 205 may also store claim response predictions of analyzed claims. The predictions stored by the claim store 205 may include a likelihood the claim will be denied, claim-level reason code classifications, service-level reason code classifications, a response date estimation, or a combination thereof. Reason codes may include Remittance Advice Remark Codes (RARCs), Claim Adjustment Reason Codes (CARCs), or any other suitable code. The claim store 205 may store claim-level reason codes and service-level reason codes as a vector, where each element of the vector corresponds to a reason code, and the value of each element represents the likelihood the corresponding reason code contributed to the denial of the claim. In addition, the claim store 205 may store training data used to train and validate one or more models of the claim analysis system 125. Training data may be extracted from historical claims, and may include claim data and corresponding claim response information, such as whether the claim was denied, a response date for the claim, and reasons for claim denial.

The claim feature store 210 maintains claim sequences of claims stored in the claim store 205 and generated by the claim feature module 220. Claim sequences are an unordered collection of medical events and aggregations of diverse code types that have implicit interrelations (e.g., between demographics and diagnoses). As such, each claim sequence is composed of multiple features that describe the claim data of a corresponding claim. Features may include, but are not limited to, patient gender, an individual relationship code, a payer state, the duration of the corresponding service, the subscriber's age, the patient's age, a payer identifier, the total charges, the service date, and the claim submission and/or transmission date. The claim sequence also includes an indication of the procedures performed and the diagnoses received.

The value of each feature is assigned a single unique token for singular elements or a subsequence of tokens. For example, demographic information may be assigned single unique tokens, and procedures and diagnoses may be assigned subsequences of tokens. Further, the values of some features may be binary, and the values of other features may be normalized counts between zero and unity. Accordingly, claim sequences may comprise two or more sub-vectors. In addition, the claim feature store 210 may store suspiciousness scores for claim sequence features. Suspiciousness scores reflect the impact individual features have on the claim's denial prediction.

The claim analysis system 125 maintains the model parameters and hyper-parameters generated by the model training module 225 and/or the interpretability module 230 in the model store 215. Examples may include network layers, embedding representations, weight matrices, and the like. The model store 215 may also include optimization techniques, such as optimizer types, loss functions, etc. In addition, the model store 215 may include baseline models that are used to evaluate the performance of the claim analysis system 125. In some embodiments, models maintained by the model store 215 are system-specific. For example, the model store 215 may maintain health care system-specific models for the analysis of claims associated with different health care systems, claim form-specific models for the analysis of claims provided on different claim forms (e.g., 837 forms and 835 forms), and the like.

The claim feature module 220 generates claim sequences that represent claims stored in the claim store 205. The claim feature module 220 does this by tokenizing claim data of corresponding claims. When the feature is a singular element (e.g., demographic information, insurance information, etc.), the claim feature module 220 assigns the feature a single unique token. When the feature includes multiple elements, e.g., when the feature is a procedure or diagnoses, the claim feature module 220 assigns the feature a subsequence of tokens. In some embodiments, the claim feature module 220 maps less frequent tokens to an out-of-vocabulary token. For example, procedures tokens that appear less than a threshold number of times in a dataset may be mapped to an out-of-vocabulary token. In these embodiments, the context of features mapped to out-of-vocabulary tokens within the corresponding claim may be identified by the machine learning model configured to predict payer response. Based on the context of out-of-vocabulary tokens, users can identify response patterns for less frequent procedures and diagnoses. For example, users may be able to determine claims associated with infrequently performed procedures are more likely to be denied or have an increased response date. The use of out-of-vocabulary tokens may reduce sparsity.

Further, the claim feature module 220 may assign tokens with binary values to some features and tokens with numeric values to other features based on characteristics of the feature. For example, a patient's age may be discretized in years, while date features may be mapped to tokens in years, months, and days. Similarly, charge amount features may be mapped to tokens quantized to thousands, hundreds, tens, and one. In some embodiments, the claim feature module 220 normalizes tokens with numeric values.

In some embodiments, features representing demographic information may be assigned binary tokens, and features representing procedures and diagnoses may be assigned numeric tokens. In these embodiments, the claim feature module 220 expresses diagnosis and procedure tokens as normalized count sequences, $x_C$ and $x_D$. The length of $x_C$ and $x_D$ may correspond to the number of possible procedure and diagnosis tokens, respectively. Similarly, in these embodiments, the claim feature module 220 expresses demographic tokens as a binary sequence, $x_O$. The length of $x_O$ may be the total number of single unique tokens. In this way, the claim feature module 220 may express a claim sequence, x, as a combination of three subsequences, $x_C$, $x_D$, and $x_O$ (Equation 1). A claim sequence, x, may have a length in thousands and include both numeric and binary tokens.

$$x \triangleq (x_C, x_D, x_O) \quad (1)$$

From the claim sequences, the claim feature module 220 generates input vectors that are applied to a trained machine learning model. The input vector may include all of the features included in a claim sequence. Alternatively, the input vector may include a portion of the features included in a claim sequence. The claim feature module 220 may select a subset of features to include in an input vector based on the requested output of the trained machine learning model, size requirements, user preferences, features of the claim data, and the like.

The model training module 225 trains a machine learning model to predict a payer's response to a claim. In some embodiments, the machine learning model is a trained neural network. In these embodiments, the model training module 225 trains a first portion of the neural network to generate an embedding from an input vector. The embedding may be a fixed-sized vector with a lower-dimensionality than the input vector. For example, the input vector may include thousands of dimensions (features) and the embedding may have 94 dimensions, 128 dimensions, 200 dimensions, etc. The model training module 225 also trains a second portion of the neural network to predict the payer's response from the embedding. The prediction includes a likelihood the claim will be denied, a response date estimation, and/or one or more sets of reason codes delineating reasons why the claim may be denied. The model training module 225 does this by training task-specific and task-agnostic neural network layers. The layers of the neural network are discussed in detail below, with reference to FIGS. 3-4. In other embodiments, other generalized linear models are trained by the model training module 225 to predict a payer's response to a claim, such as logistic regression models and support vector machine models.

The interpretability module 230 identifies which aspects of the claim should be reviewed. The interpretability module 230 does this by computing a gradient magnitude of the prediction score for each feature of the input vector. The gradient magnitude of the prediction score (referred to as a "suspiciousness score") represents the contribution of an input feature on the denial prediction of a corresponding claim. In some embodiments, the interpretability module 230 calculates suspiciousness scores using a single back-propagation pass through the neural network. In other embodiments, the interpretability module 230 calculates suspiciousness scores by taking the gradients of the outputs with respect to the input and multiplying the gradient by the input feature values. Additionally, or alternatively, the interpretability module 230 may calculate suspiciousness scores by replacing each input feature with a reference value and computing the different in the output. Input features may be grouped and ablated together.

The interpretability module 230 may flag input features with suspiciousness scores above a threshold suspiciousness score such that users may review and modify claim data. Threshold suspiciousness scores may be determined by the claim analysis system 125, a user, and the like. In some embodiments, the interpretability module 230 calculates suspiciousness scores when the denial prediction has a denial probability greater than a threshold probability (e.g., over 45%, 50%, 55%, 75%). In other embodiments, the interpretability module 230 calculates suspiciousness scores for all claims, when explicitly requested by a user of the claim analysis system 125, and the like.

The claim analysis system 125 includes a user interface 235 that enables users to interact with the claim analysis system 125. Through the user interface 235, the user may request claims to be analyzed, view prediction results and suspiciousness scores, modify claim features and/or claim data, and the like. Users may also use the user interface 235 to aggregate and analyze data across multiple claims and/or across multiple health systems. This allows users to identify which claim features contribute to claim denials most frequently, which data fields are most susceptible to data entry errors, and the like. The user interface 235 may also include additional elements that allow the user to generate training data, select model parameters and/or training schema, and the like.

Figure 3:
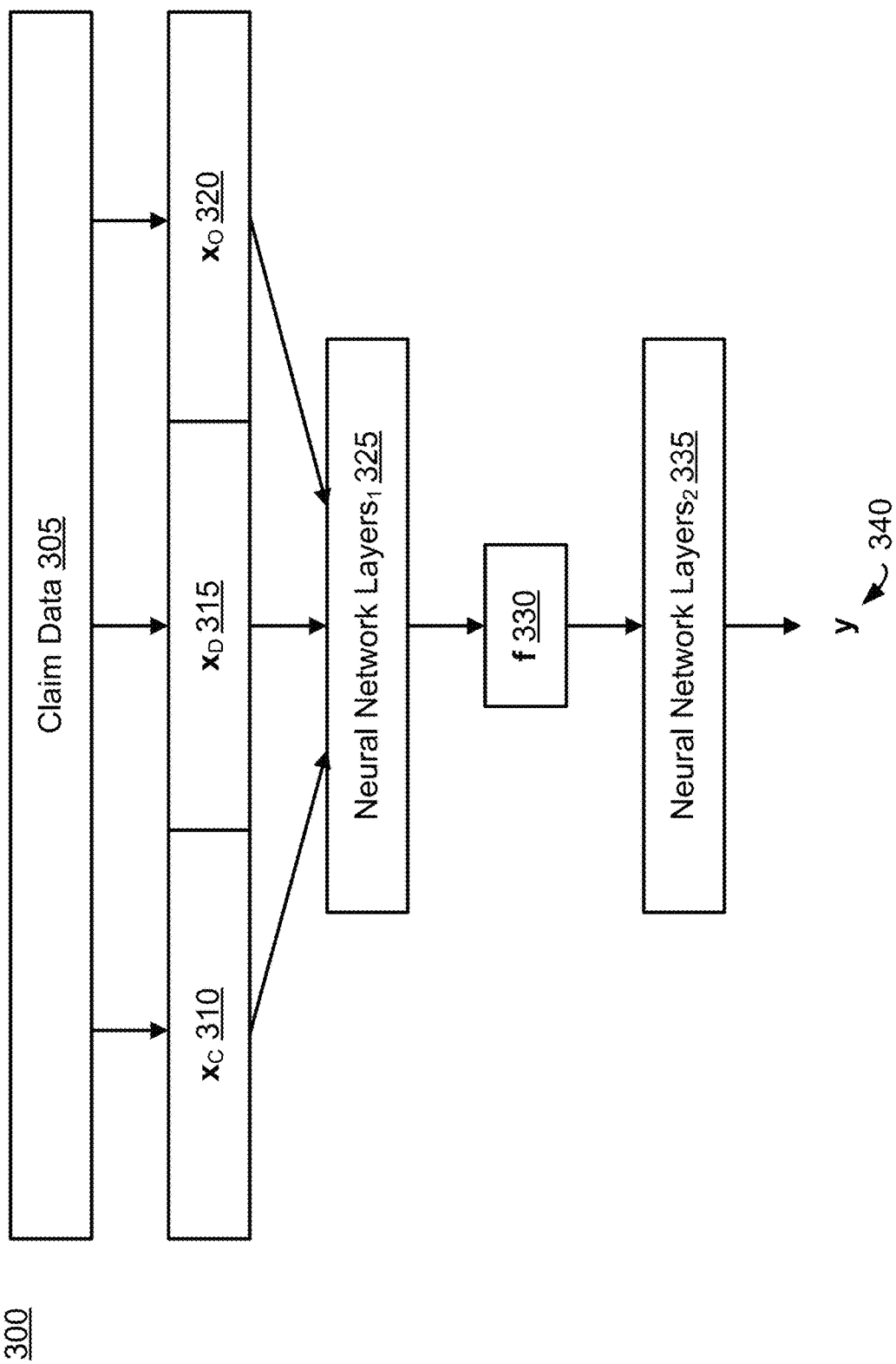
FIG. 3 is a block diagram illustrating a method of analyzing a claim, according to one embodiment.

FIG. 3 is a high-level block diagram illustrating a method 300 of analyzing a claim, according to one embodiment. In the method shown, the claim feature module 220 tokenizes claim data 305 to generate a claim sequence. A portion of the claim sequence is included in an input vector, x, which includes three sub-vectors, namely sub-vectors $x_C$ 310, $x_D$ 315, and $x_O$ 320. As previously discussed, $x_C$ 310 includes a sequence of procedure tokens with numeric values, $x_D$ 315 includes a sequence of diagnoses tokens with numeric values, and $x_O$ includes a sequence of single unique feature tokens with binary values. The sub-vectors $x_C$ 310, $x_D$ 315, and $x_O$ 320 are applied to a first portion of the neural network that includes a first set of neural network layers 325. The first set of neural network layers generates an embedding, f 330, from the input vector, x. The generation of the embedding f 330 is discussed in detail below with reference to FIG. 4. The embedding f 330 is applied to a second portion of the neural network that includes a second set of neural network layers 335 to generate a prediction of whether the claim will be denied, y 340, which is a vector defined by Equation (2). Accordingly, the second set of neural network layers 335 includes one or more task-specific output layers configured to generate a prediction for a corresponding element of y 340.

$$y \triangleq (y_0, y_1, y_2, y_3) \quad (2)$$

In Equation 2, y 340 includes four output elements. The first output element, $y_0$, is a claim denial variable representing the likelihood the claim will be denied. For example, a claim denial variable with a value of 0.54 indicates there is a 54% chance the corresponding claim will be denied. The second and third output elements, $y_1$ and $y_2$, are vectors of reason codes for claim-level reasons and service-level reasons, respectively. Each vector element represents a reason for the claim denial, and the value of each element indicates the contribution the reason code had on the claim denial prediction. The element values in $y_1$ and $y_2$ may be normalized counts in frequency. The fourth output element, $y_3$, is a response date variable. In some embodiments, $y_3$ is a day interval between a remittance date and the corresponding claim submission date. Therefore, the prediction y 340 includes a probability the claim will be denied under a set of possible denial reason codes in how many days.

The model training module 225 applies a multi-task learning approach to train the neural network. This approach helps ensure the neural network properly captures each claim by sharing the embedding while keeping task-specific output layers. To optimize the parameters of the neural network, the model training module 225 may minimize the loss, $\mathcal{L}$, according to Equation (3). In some embodiments, the loss is minimized using an ADAM optimizer. In other embodiments, other suitable optimizers are used.

$$\mathcal{L} = \lambda_0 \mathcal{L}_0 + \lambda_1 \mathcal{L}_{svc} + \lambda_2 \mathcal{L}_{claim} + \lambda_3 \mathcal{L}_{date} \quad (3)$$

In Equation (3), $\mathcal{L}_0$ is a binary cross-entropy loss for the denial probability prediction, $\mathcal{L}_{svc}$ is a categorical cross-entropy loss for the set of service-level denial reason code classifications, $\mathcal{L}_{claim}$ is a categorical cross-entropy loss for the set of claim-level denial reason code classifications, $\mathcal{L}_{date}$ is a distance for the first response days prediction for the response date estimation, and $\lambda_0$, $\lambda_1$, $\lambda_2$, $\lambda_3$ are hyperparameters.

In some embodiments, the model training module 225 uses a sigmoid function for predicting the claim denial variable, $y_0$, softmax functions for predicting denial reason codes, $y_1$ and $y_2$, and a linear function for predicting the response date variable, $y_3$. In these embodiments, Equation (3) may be rewritten according to Equations (4)-(7).

$$arg\ min(f,H,W) \mathcal{L}\ \mathcal{L}_{BCE}(y_0, \sigma(W_0 f + b_0)) \quad (4)$$

$$+\lambda_0 \mathcal{L}_{CCE}(y_1, softmax(W_1 f + b_1)) \quad (5)$$

$$+\lambda_1 \mathcal{L}_{CCE}(y_2, softmax(W_2 f + b_2)) \quad (6)$$

$$\lambda_2 \mathcal{L}_1(y_3, W_3 f + b_3). \quad (7)$$

In Equations (4)-(7), $\mathcal{L}_{BCE}$ is the binary cross-entropy loss, $\mathcal{L}_{CCE}$ is the categorical cross-entropy loss, $\sigma$ is a sigmoid function, $W_1$, $W_2$, $W_3$ are embedding matrices, $b_1$, $b_2$, and $b_3$ are bias terms. The constraints as defined in Equations (5)-(7) act as barrier functions to guide the convergence of the embedding, f.

Figure 4:
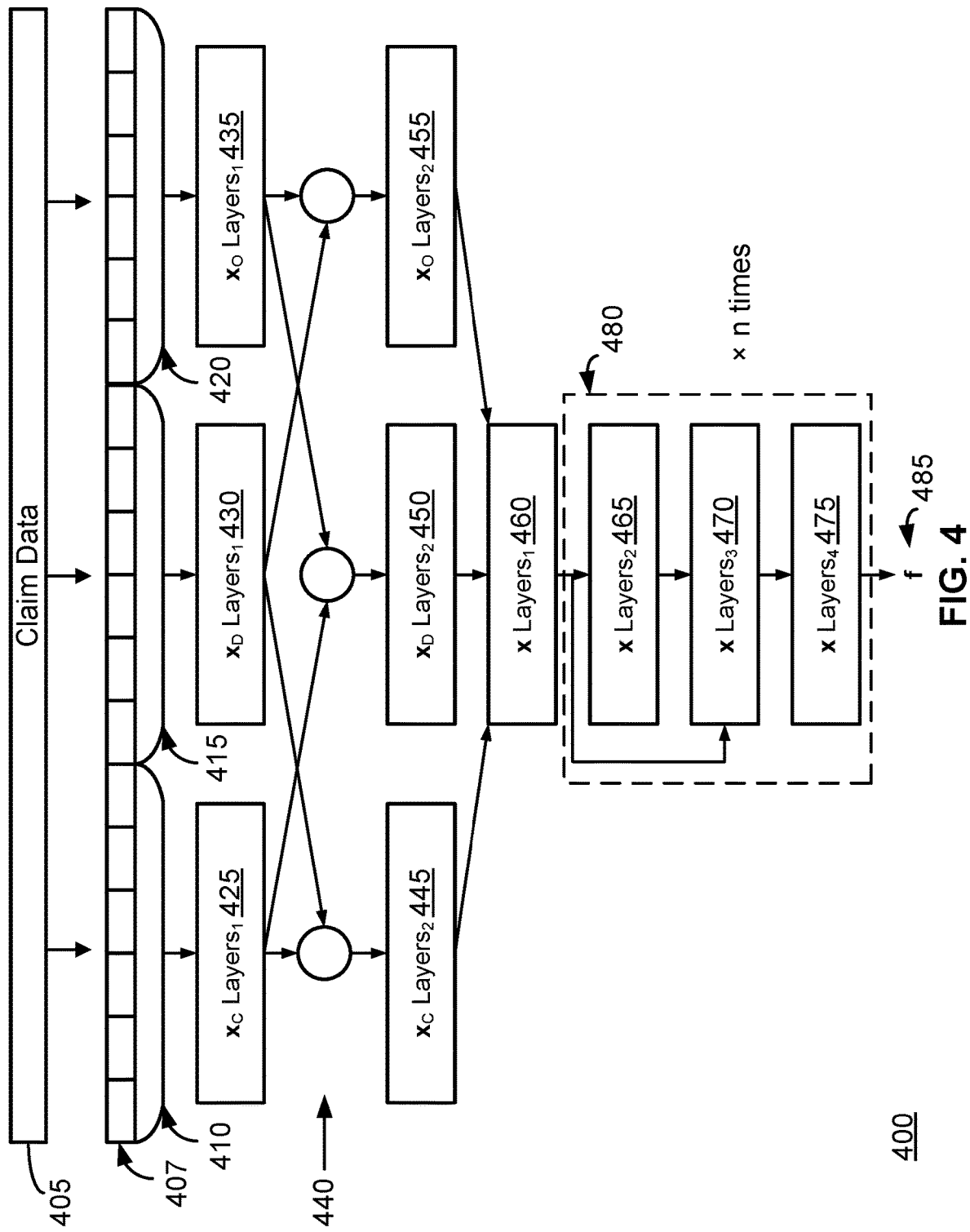
FIG. 4 is a block diagram illustrating a method of generating an embedding, according to one embodiment.

FIG. 4 is a high-level block diagram illustrating a method of generating an embedding, according to one embodiment. The embedding is a low-dimension representation of the claim that removes high redundancies in the input layer and reduces memory requirements. The machine learning model does this by compressing claim sequences with thousands of dimensions into a fixed-sized latent vector, f ("embedding"). The embedding, f, may include any suitable number of dimensions, such as 64 dimensions, 94 dimensions, or 200 dimensions.

As shown in FIG. 3, the first portion of the neural network generates the embedding for a claim. However, in some embodiments, the steps of generating an output vector from an input vector (i.e., a claim sequence or portion thereof) are not delineated as shown. In these embodiments, the neural network may include fewer or additional portions that are collectively configured to generate an output vector from an input vector. Further, in some embodiments, the neural network generates the input vector from the claim data of a corresponding claim. In other embodiments, the neural network is applied to a previously-generated input vector.

In the illustration 400 shown, claim data 405 corresponding to a claim is tokenized to generate an input vector x 407, which includes three sub-vectors, $x_C$ 410, $x_D$ 415, and $x_O$ 420. As previously discussed, the elements in each of the sub-vectors may include numeric or binary values based on the data they represent. The sub-vectors are applied to a set of sub-vector-specific layers. As shown, $x_C$ 410 is applied to $x_C$ layers$_1$ 425, $x_D$ 415 is applied to $x_D$ layers$_1$ 430, and $x_O$ 420 is applied to $x_O$ layers$_1$ 435. In some embodiments, each set of sub-vector-specific layers includes one or more of a weighting function, a batch normalization function, and an activation function. The batch normalization and activation functions raise embedding expressivity over baseline embeddings. The layers in each set may include the same or similar configuration of layers, different configurations of layers, etc.

The outputs of the sub-vector-specific layers are applied to multiplicative layers 440. The multiplicative layers 440 increase the representational power of the embedding by capturing pairwise interactions between sub-vectors more effectively. In some embodiments, the multiplicative layers 440 include element-wise multiplication operations. The outputs of the multiplicative layers 440 are applied to additional layers of the neural network to further increase the representation of the embedding. As shown, the outputs of the multiplicative layers 440 are applied to a second set of sub-vector-specific layers, namely $x_C$ layers$_2$ 445, $x_D$ layers$_2$ 450, and $x_O$ layers$_2$ 455. In some embodiments, the second sets of sub-vector-specific layers include a weighting function and a batch normalization function.

The outputs of the second set of sub-vector-specific layers are applied to one or more sets of sub-vector-agnostic layers. In the illustration shown, the outputs are applied to a first set of layers, x layers$_1$ 460. In some embodiments, the x layers$_1$ 460 include an addition function and an activation function. The output of x layers$_1$ 460 is applied to a second set of layers, x layers$_2$ 465, and/or a third set of layers, x layers$_3$ 470. In some embodiments, the x layers$_2$ 465 include one or more of a weighted function, a batch normalization function, and an activation function, and the x layers$_3$ 470 include an addition function. The output of the x layers$_2$ 465 is applied to the x layers$_3$ 470, and the output of the x layers$_3$ 470 is applied to a fourth set of layers, x layers$_4$ 475. In some embodiments, the x layers$_4$ 475 includes an activation function. The process of applying model output to one or more of the x layers$_2$ 465, x layers$_3$ 470, and x layers$_4$ 475 may be repeated 480 to generate an enriched embedding f 485 (e.g., 2 times, 3 times, 5 times, 10 times, etc.).

Figure 5:
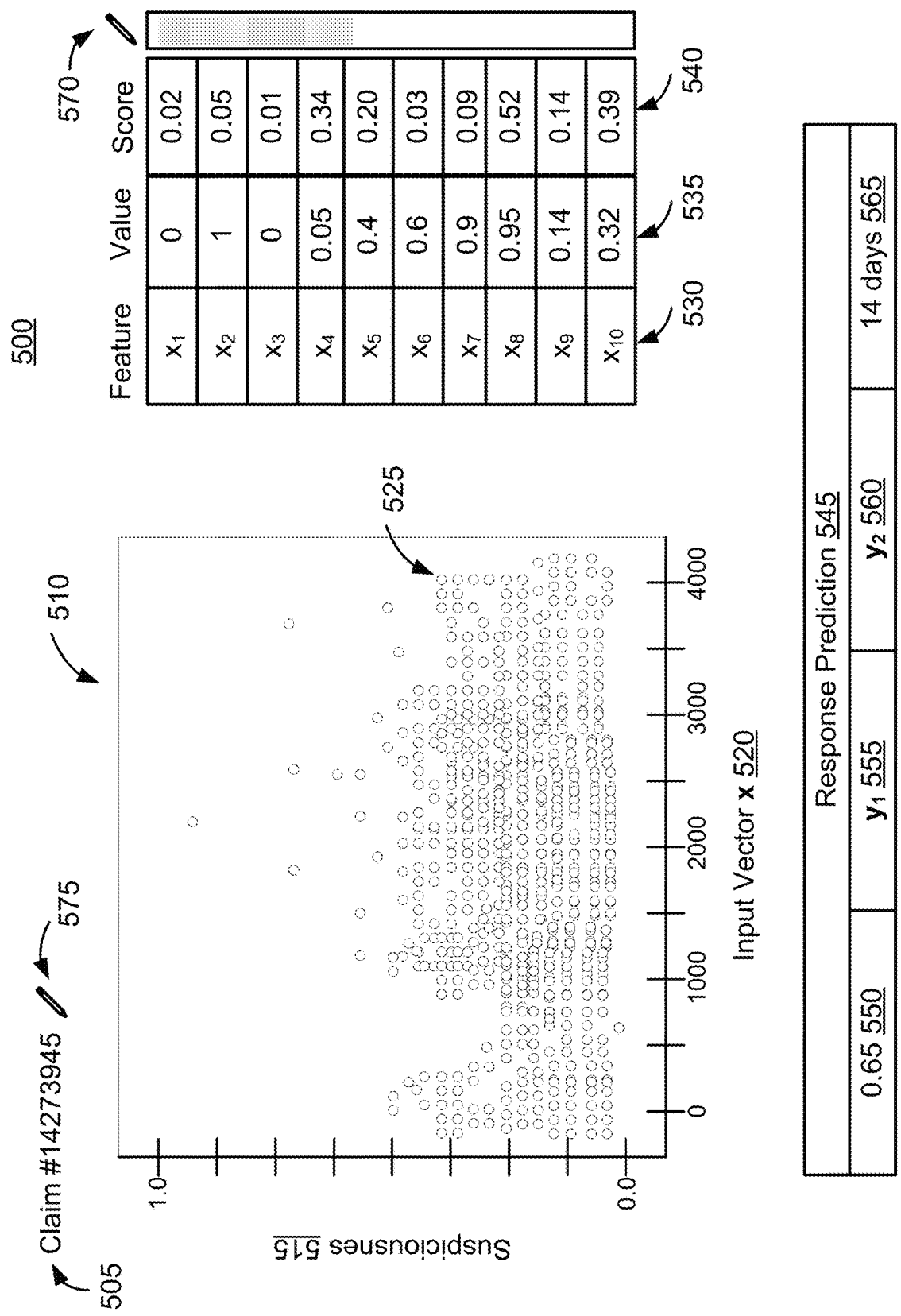
FIG. 5 is a block diagram illustrating an exemplary user interface of the claim analysis system, according to one embodiment.

FIG. 5 is a high-level block diagram illustrating an exemplary user interface 500 of the claim analysis system 125, according to one embodiment. The user interface 500 shown includes the prediction results of a claim 505. An area of the user interface 500 includes a suspiciousness graph 510. The suspiciousness graph 510 is generated by the interpretability module 230. The suspiciousness graph 510 represents suspiciousness scores on an ordinate axis 515 and an input vector on the abscissa axis 520. Each feature in the input vector is represented with a circle, e.g., circle 525, such that a user may visually determine the suspiciousness scores of claim features and identify which features have higher suspiciousness scores.

Another area of the user interface 500 displays the features included in the input vector, the values of the features, and their corresponding suspiciousness scores. For example, the tenth feature in the input vector, $x_{10}$ 530 has a value 535 of 0.32 and a suspiciousness score 540 of 0.39. This indicates that the probability the value of $x_{10}$ 530 contributes to the denial of the claim 505 is 39%. In some embodiments, the value of each feature shown is the value of the assigned token. In other embodiments, the value of each feature shown is the raw data value.

A third area of the user interface 500 may display the response prediction 545 of the claim 505, as determined by the claim analysis system 125. The response prediction 545 includes the claim denial variable, $y_0$ 550, the claim-level reasons the claim will be denied, $y_1$ 555, the service-level reasons the claim 505 will be denied, $y_2$ 560, and a response date estimation 565. In the example shown, there is a 65% chance the claim 505 will be denied because of the reason codes delineated in $y_1$ 555 and $y_2$ 560, and a response is likely to arrive within 14 days of the claim submission date.

Based on the response prediction 545 and the suspiciousness scores of individual features, the user may edit the claim 505. The user may do this may modifying the values of particular features using a user interface element 570 of the user interface 500. In some embodiments, the features the user may edit may be restricted. For example, the user may only be able to edit features that are likely to have data-entry errors, have suspiciousness scores above a threshold suspiciousness score, correspond to certain data fields, etc. The user may edit feature values by modifying the values of the assigned tokens, and/or the values in the claim data. The claim analysis system updates the response prediction 545 of the claim 505 and the suspiciousness scores of the sequence features based on the modified values. This allows the user to determine the impact modifications have on the denial probability of the claim, reasons for claim denial, and/or response date estimation.

The user interface 500 shown includes an additional user interface element 575 that allows the user to select an additional claim to analyze. In some embodiments, the user interface 500 includes interface elements that allow the user to compare multiple claims across one or more health care systems to identify patterns in claim data. Users may then determine correlations between claim data and denial probabilities, claim data and claim denial reason codes, patterns in response date estimations, and the like.

Figure 6:
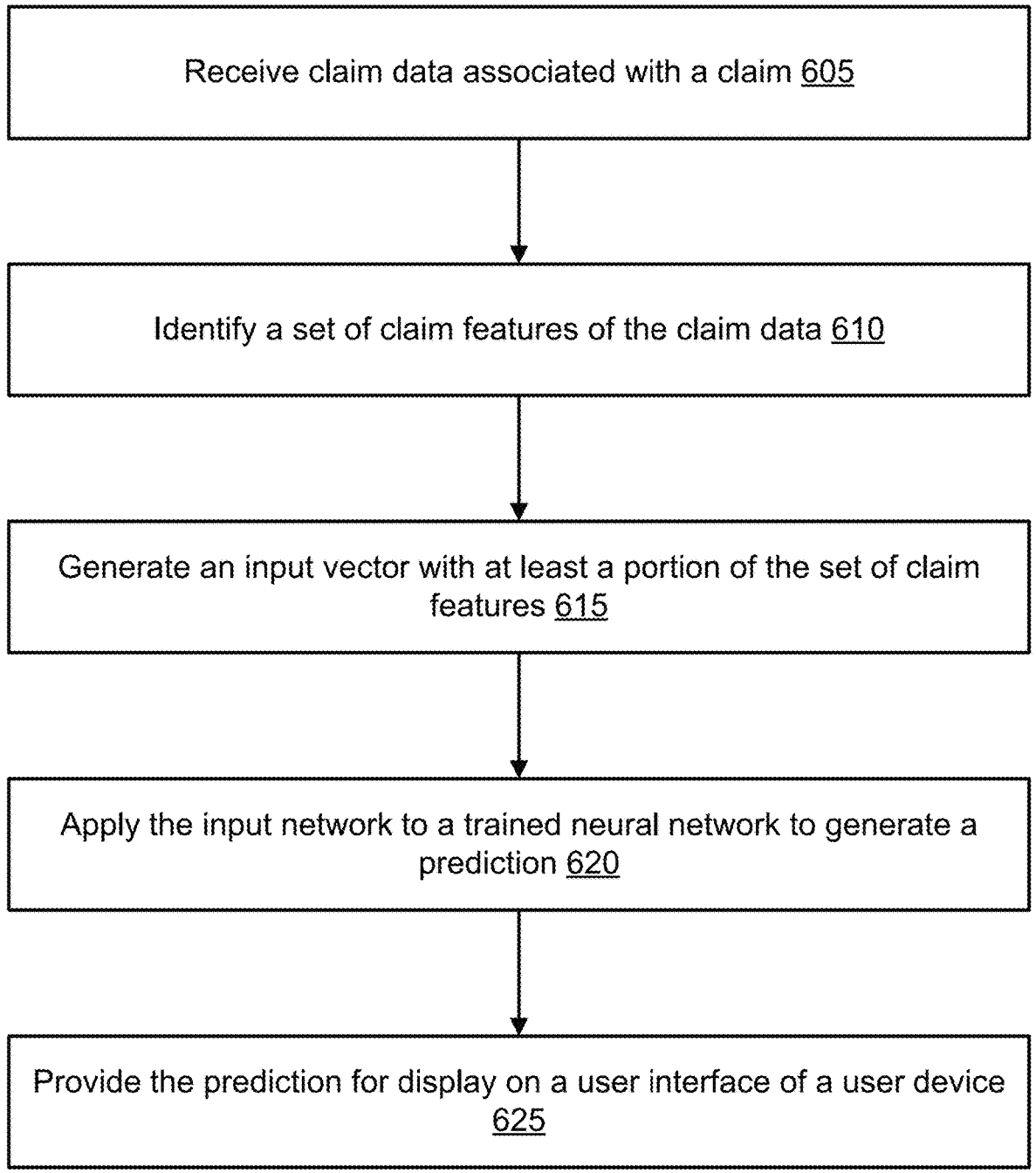
FIG. 6 is a flowchart illustrating an exemplary process for analyzing a claim, according to one embodiment.

FIG. 6 is a flowchart illustrating an exemplary process 600 for analyzing a claim, according to one embodiment. In the process 600 shown, claim data associated with a claim is received 605. A set of claim features of the claim data is identified 610 to generate a claim sequence. An input vector is generated 615 with at least a portion of the set of claim features. The set may include demographic information, procedure information and diagnoses information. The input is applied 620 to a trained neural network. A first portion of the neural network is configured to generate an embedding representing the input vector with a lower dimensionality than the input vector. A second portion of the neural network is configured to generate a prediction of whether the claim will be denied based on the embedding. The prediction may include a probability the claim will be denied. In some embodiments, the prediction further includes a first reason code sequence that includes likelihood scores for claim-level reason codes in a set of claim-level reason codes. In these embodiments, the neural network includes a first set of task-specific output layers configured to generate the first reason code sequence.

The prediction may further include a second reason code sequence that includes likelihood scores for service-level reason codes in a set of service-level reason codes. In these embodiments, the neural network includes a second set of task-specific output layers configured to generate the second reason code sequence. The prediction may further include a response date estimation that represents a day interval between a remittance date and the corresponding claim submission date. In these embodiments, the neural network includes a third set of task-specific output layers configured to generate the response date estimation.

The prediction is provided for display 625 on a user interface 235 of a user device. In some embodiments, the prediction further includes a gradient-based score for each feature in the input vector and a probability the claim will be denied. Each gradient-based score indicates the extent to which the corresponding feature contributes to the probability of the claim being denied. In these embodiments, the gradient-based scores for a portion of the features in the input vector are provided for display on the user interface. The user interface may also include an interface element that allows the user to modify one or more values of the claim data. Responsive to determining the user modifies the one or more values, an updated input vector is generated that includes the one or more modified values. The updated vector is inputted into the neural network to generate an updated prediction. The updated prediction is provided from display on the user interface 235. This allows the user to determine the impact of the modification on the prediction.

Figure 7:
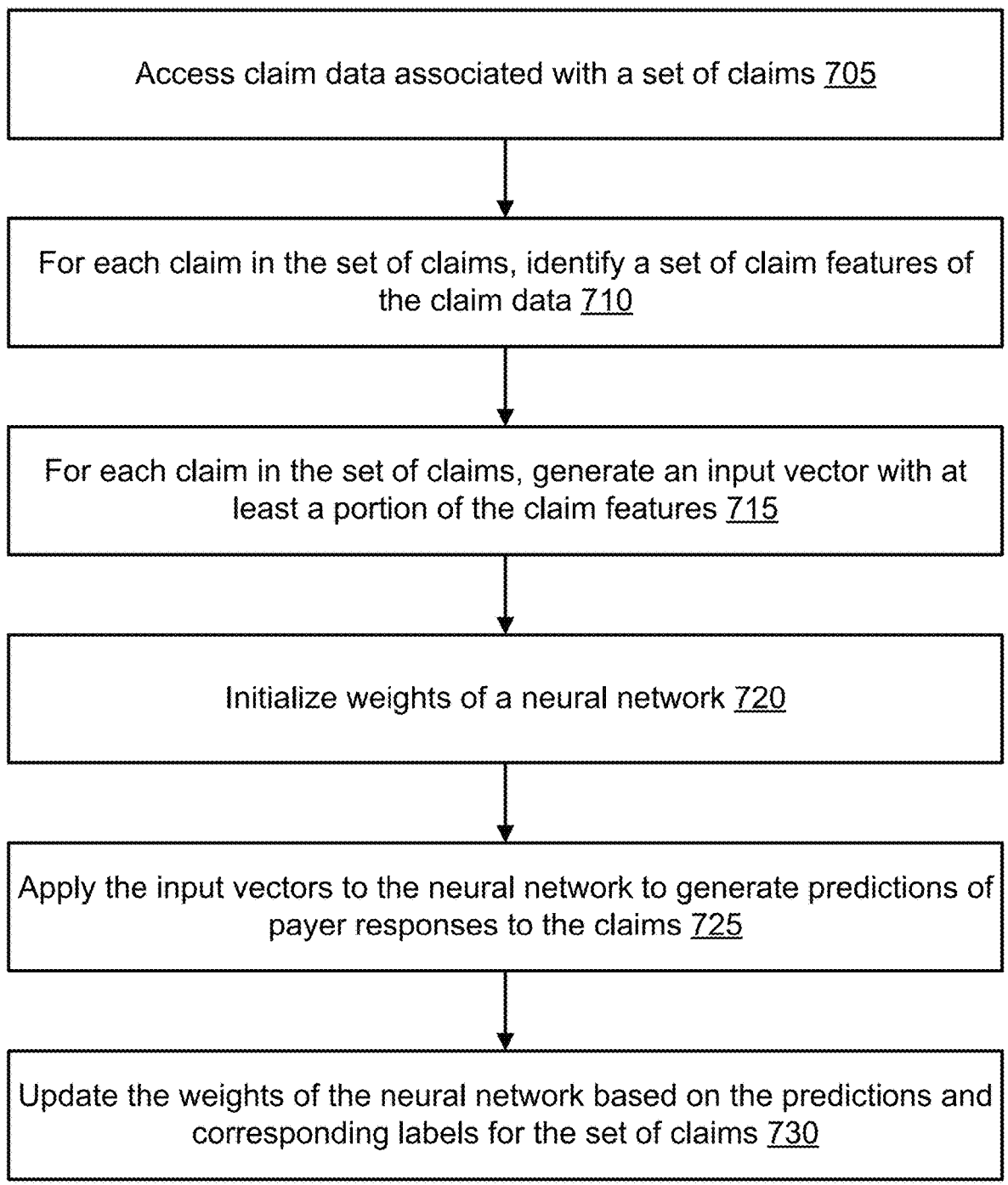
FIG. 7 is a flowchart illustrating an exemplary process for training the claim analysis system, according to one embodiment.

FIG. 7 is a flowchart illustrating an exemplary process 700 for training the claim analysis system 125, according to one embodiment. In the process 700 shown, claim data associated with a set of claims is accessed 705. Each claim in the set of claims includes a label representing a payer response. For example, the label may include a claim deniable variable representing whether the claim was denied. The label may also include a first reason code sequence including claim-level reasons the claim was denied, a second reason code sequence including service-level reasons the claim was denied, and/or a response date representing a day interval between a remittance data of the claim and a submission date of the claim.

For each claim in the set of claims, claim features of the claim data are identified 710 and an input vector with at least a portion of the claim features is generated 715. The weights of a neural network are initialized 720. The input vectors of the set of claims are applied 725 to the neural network to generate predictions of payer responses to the claims. The neural network may be configured to generate a prediction that further includes a gradient-based score for each feature of the corresponding input vector that indicates the extent to which the corresponding feature contributes to the prediction of the payer response. The weights of the neural network are updated 730 based on the predictions and corresponding labels for the set of claims.

Figure 8:
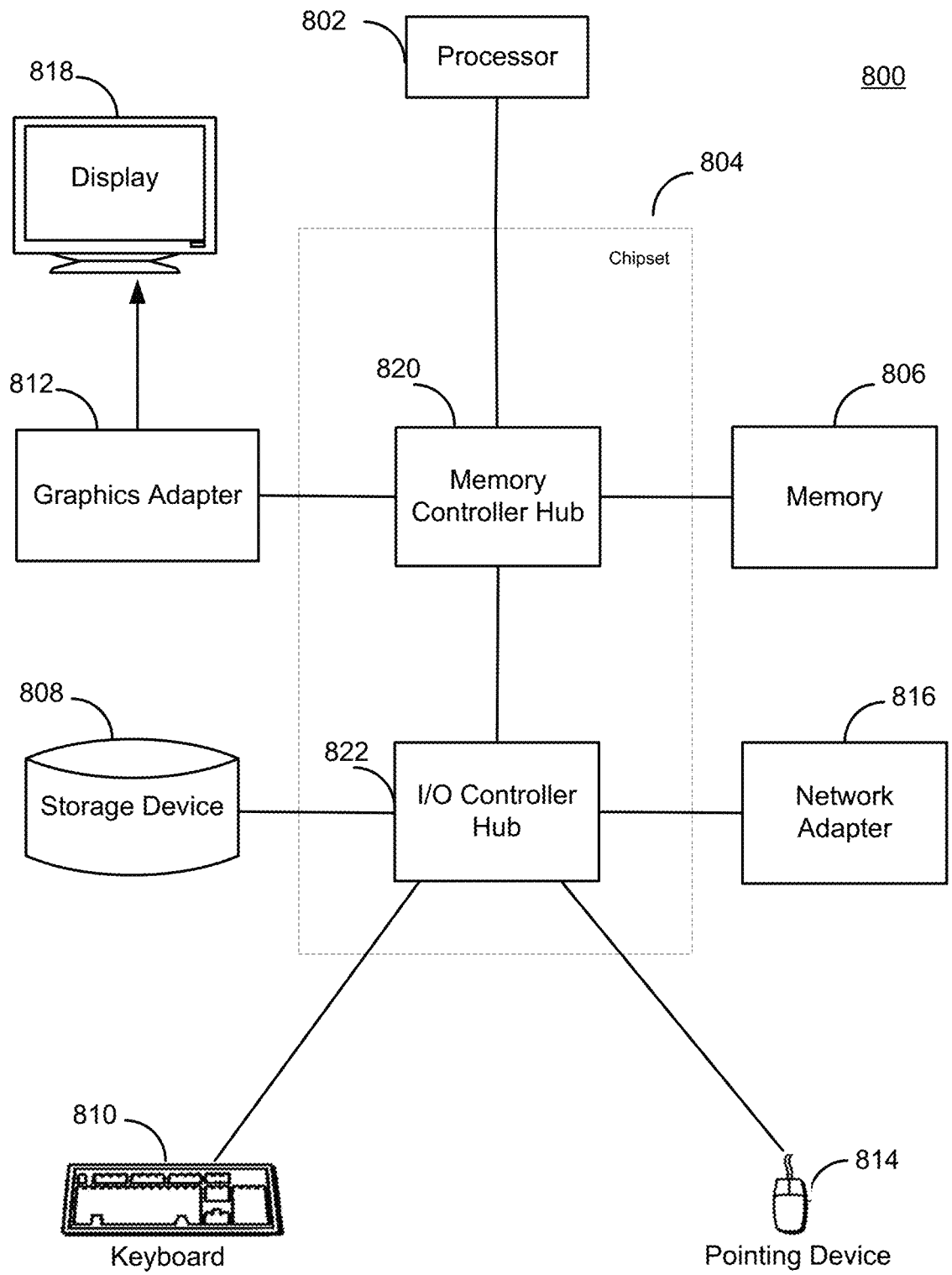
FIG. 8 is a block diagram illustrating an example of a computer suitable for use as the claim analysis system of FIG. 1, according to one embodiment.

FIG. 8 is a block diagram illustrating an example of a computer suitable for use as the claim analysis system of FIG. 1, according to one embodiment. The example computer 800 includes a processor 802 coupled to a chipset 804. For convenience and readability, this disclosure refers to a processor 802 performing various functions, but all such references should be understood to also include multiple processors working together to perform such functions. The chipset 804 includes a memory controller hub 820 and an input/output (I/O) controller hub 822. A memory 806 and a graphics adapter 812 are coupled to the memory controller hub 820, and a display 818 is coupled to the graphics adapter 812. A storage device 808, keyboard 810, pointing device 814, and network adapter 816 are coupled to the I/O controller hub 822. Other embodiments of the computer 800 have different architectures.

In the embodiment shown in FIG. 8, the storage device 808 is a non-transitory computer-readable storage medium such as a hard drive, compact disk read-only memory (CD-ROM), DVD, or a solid-state memory device. The memory 806 holds instructions and data used by the processor 802. The pointing device 814 is a mouse, track ball, touch-screen, or other type of pointing device, and is used in combination with the keyboard 810 (which may be an on-screen keyboard) to input data into the computer system 800. The graphics adapter 812 displays images and other information on the display 818. The network adapter 816 couples the computer system 800 to one or more computer networks.

The types of computers used can vary depending upon the embodiment and the processing power required by the entity. Furthermore, the computers can lack some of the components described above, such as keyboards 810, graphics adapters 812, and displays 818.

ADDITIONAL CONSIDERATIONS

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for providing the disclosed functionality. Thus, while particular embodiments and applications have been illustrated and described, it is to be understood that the described subject matter is not limited to the precise construction and components disclosed. The scope of protection should be limited only by any claims that issue.

What is claimed is:

1. A method of analyzing claims, the method comprising:
   identifying a set of claim features of a claim;
   generating an input vector comprising at least a portion of the set of claim features;
   applying the input vector to a trained neural network, wherein a first portion of the neural network is to generate an embedding representing the input vector with a lower dimensionality than the input vector, and wherein a second portion of the neural network is to generate a prediction of whether the claim is to be denied based, at least in part, on the embedding; and providing the prediction for display on a user interface of a user device, wherein:

the prediction includes a gradient-based score for at least one feature of the input vector and a probability that the claim is to be denied;

the gradient-based score indicates an extent to which the at least one feature contributes to the probability that the is to be denied; and providing the prediction for display further comprises:

providing for display, on the user interface of the user device, the gradient-based score for the at least one feature in the input vector;

providing an interface element to allow a user to modify one or more values associated with the claim; and responsive to determining that the user modified one or more values associated with the claim:

generating an updated input vector, the updated input vector including the modified one or more values;

applying the updated input vector to the trained neural network to generate an updated prediction; and providing the updated prediction for display on the user interface of the user device.

2. The method of claim 1, wherein the prediction further includes a first reason code sequence, a second reason code sequence and a response date estimation, wherein the first reason code sequence includes likelihood scores for claim-level reason codes in a set of claim-level reason codes, and wherein the second reason code sequence includes likelihood scores for service-level reason codes in a set of service-level reason codes.

3. The method of claim 2, wherein the neural network includes:

a first set of task-specific output layers to generate the first reason code sequence, a second set of task-specific output layers to generate the second reason code sequence, and a third set of task-specific layers to generate the response date estimation.

4. The method of claim 1, wherein the input vector includes: a first set of token sequences representing procedure tokens, a second set of token sequences representing diagnosis tokens or a third set of token sequences representing demographic tokens, or a combination thereof.

5. The method of claim 1, wherein the prediction includes a denial probability prediction, a set of service-level reason code classifications, a set of claim-level reason code classifications and a response date estimation, and wherein the neural network is trained according to a joint loss function that is defined by:

$$\mathcal{L} = \lambda_0 \mathcal{L}_0 + \lambda_1 \mathcal{L}_{svc} + \lambda_2 \mathcal{L}_{claim} + \lambda_3 \mathcal{L}_{date}$$

wherein $\mathcal{L}_0$ is a binary cross-entropy loss for the denial probability prediction, $\mathcal{L}_{svc}$ is a categorical cross-entropy loss for the set of service-level denial reason code classifications, $\mathcal{L}_{claim}$ is a categorical cross-entropy loss for the set of claim-level denial reason code classifications, $\mathcal{L}_{date}$ is a distance for the first response days prediction for the response date estimation, and $\lambda_0$, $\lambda_1$, $\lambda_2$, $\lambda_3$ are hyper-parameters.

6. The method of claim 1, wherein the gradient-based score comprises a suspiciousness score.

7. The method of claim 1, wherein the modified one or more values are based, at least in part, a correction to a previously incorrectly entered claim feature received via the user interface.

8. A non-transitory computer-readable storage medium containing computer program code comprising instructions that, when executed by a processor, cause the processor to:

identify a set of claim features of a claim;

generate an input vector with at least a portion of the set of claim features;

apply the input vector to a trained neural network, wherein a first portion of the neural network is to generate an embedding representing the input vector with a lower dimensionality than the input vector, and wherein a second portion of the neural network is to generate a prediction of whether the claim is to be denied based, at least in part, on the embedding; and provide the prediction for display on a user interface of a user device, wherein:

the prediction to include a gradient-based score for at least one feature of the input vector and a probability that the claim is to be denied, and wherein the gradient-based score to indicate an extent to which the at least one feature contributes to the probability of the claim to be denied, wherein the instructions, when executed by the processor, further cause the processor to:

provide for display, on the user interface of the user device, the gradient-based scores for each feature in the input vector;

provide an interface element to allow a user to modify one or more values associated with the claim data; and responsive to determination that the user modified one or more values associated with the claim data:

generate an updated input vector, the updated input vector including the modified one or more values;

apply the updated input vector to the trained neural network to generate an updated prediction; and provide the updated prediction for display on the user interface of the user device.

9. The non-transitory computer-readable storage medium of claim 8, wherein the prediction further includes a first reason code sequence, a second reason code sequence, and a response date estimation, wherein the first reason code sequence includes likelihood scores for claim-level reason codes in a set of claim-level reason codes, and wherein the second reason code sequence includes likelihood scores for service-level reason codes in a set of service-level reason codes.

10. The non-transitory computer-readable storage medium of claim 9, wherein the neural network includes:

a first set of task-specific output layers to generate the first reason code sequence, a second set of task-specific output layers to generate the second reason code sequence, and a third set of task-specific layers to generate the response date estimation.

11. The non-transitory computer-readable storage medium of claim 8, wherein the input vector includes a first set of token sequences representing procedure tokens, a second set of token sequences representing diagnosis tokens, or a third set of token sequences representing demographic tokens, or a combination thereof.

12. The non-transitory computer-readable storage medium of claim 8, wherein the prediction includes a denial probability prediction, a set of service-level reason code classifications, a set of claim-level reason code classifications, and a response date estimation, and wherein the segmentation block is optimized according to a joint loss function that is defined by:

$$\mathcal{L} = \lambda_0 \mathcal{L}_0 + \lambda_1 \mathcal{L}_{svc} + \lambda_2 \mathcal{L}_{cla} + \lambda_3 \mathcal{L}_{date}$$

wherein $\mathcal{L}_0$ is a binary cross-entropy loss for the denial probability prediction, $\mathcal{L}_{svc}$ is a categorical cross-entropy loss for the set of service-level denial reason code classifications, $\mathcal{L}_{claim}$ is a categorical cross-entropy loss for the set of claim-level denial reason code classifications, $\mathcal{L}_{date}$ is a distance for the first response days prediction for the response date estimation, and $\lambda_0$, $\lambda_1$, $\lambda_2$, $\lambda_3$ are hyper-parameters.

13. The non-transitory computer-readable storage medium of claim 8, wherein the gradient-based score comprises a suspiciousness score.

14. The non-transitory computer-readable storage medium of claim 8,
wherein the modified one or more values are based, at least in part, a correction to a previously incorrectly entered claim feature received via the user interface.

* * * * *